(12) United States Patent
Wan et al.

(10) Patent No.: US 7,217,386 B2
(45) Date of Patent: May 15, 2007

(54) PREPARATION OF NANOCOMPOSITES OF ALUMINA AND TITANIA

(75) Inventors: Julin Wan, Clifton Park, NY (US); Amiya K. Mukherjee, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 522 days.

(21) Appl. No.: 10/910,556

(22) Filed: Aug. 2, 2004

(65) Prior Publication Data

US 2006/0022386 A1 Feb. 2, 2006

(51) Int. Cl.
C04B 35/622 (2006.01)
C04B 35/478 (2006.01)

(52) U.S. Cl. .................. 264/434; 264/332; 264/430

(58) Field of Classification Search ......... 264/332, 264/430, 434; 501/127, 134
See application file for complete search history.

(56) References Cited

U.S. PATENT DOCUMENTS

| | | | |
|---|---|---|---|
| 4,746,638 A | 5/1988 | Hori et al. | |
| 4,778,542 A | 10/1988 | Clemens | |
| 4,892,850 A | 1/1990 | Hori | |
| 4,985,051 A | 1/1991 | Ringwood | |
| 5,296,189 A | 3/1994 | Kang et al. | |
| 5,328,501 A | 7/1994 | McCormick et al. | |
| 5,612,110 A | 3/1997 | Watremez | |
| 5,773,922 A | 6/1998 | Lee et al. | |
| 5,837,030 A | 11/1998 | Schulz et al. | |
| 6,478,994 B1 * | 11/2002 | Sneddon et al. | 264/43 |
| 6,604,941 B2 | 8/2003 | Billings | |
| 6,617,049 B2 | 9/2003 | Darolia et al. | |
| 6,858,173 B2 * | 2/2005 | Zhan et al. | 264/430 |
| 7,029,613 B2 * | 4/2006 | Wan et al. | 264/123 |

OTHER PUBLICATIONS

Zhan et al., "A Novel Processing Route to Develop a Dense NanoCrystalline Alumina Matrix Nanocomposite Material", J. Am Ceramic Soc. 86 [1], pp. 200-202.*

Boyd, F.R. et al.; "Apparatus for Phase-Equilibrium Measurements at Pressures up to 50 Kilobars and Temperatures up to 1750'C"; 1960, *Journal of Geophysical Research*, vol. 65, No. 2, pp. 741-748.

Buessum, W.R. et al.; "Thermal Expansion Hysteresis of Aluminum Titanate"; 1952, *Ceram. Age*, vol. 60, No. 5, pp. 38-40.

Hahn, Horst; "Nicrostructure and Properties of Nanostructured Oxides"; 1993, *NanoStructured Materials*, vol. 2, pp. 251-265.

Kato, Etsuro et al.; "Decomposition Temperature of $\beta$-$Al_2TiO_5$"; 1980, *Journal of the American Ceramic Society*, pp. 355-356.

Kear, B.H. et al.; "On the Processing of Nanocrystalline and Nanocomposite Ceramics"; 2001, *Scripta Mater.*, vol. 44, pp. 2065-2068.

Kim, Ik Jin et al.; "Thermal Shock Resistance and Thermal Expansion Behaviour with Composition and Microstructure of $Al_2TiO_5$ Ceramics"; 2000, *Canadian Metallurgical Quarterly*, vol. 39, No. 4, pp. 387-396.

Michel, D. et al.; "Mechanical alloying of oxides"; 1997, *Ann. Chim. Sci. Mat.*, vol. 22, pp. 403-416.

Panchula, Martin L. et al.; "Mechanical Synthesis of Nanocrystalline $\alpha Al_2O_3$ Seeds for Enhanced Transformation Kinetics"; 1997, *NanoStructured Materials*, vol. 9, pp. 161-164.

Uhlmann, D.R. et al.; "The effect of high pressure on crystallization kinetics with special reference to fused silica"; 1966, *Physics and Chemistry of Glasses*, vol. 7, No. 5, pp. 159-168.

* cited by examiner

*Primary Examiner*—Carlos Lopez
(74) *Attorney, Agent, or Firm*—Townsend and Townsend and Crew LLP.; Henry Heines

(57) ABSTRACT

High-density composites of alumina and titania with nano-sized grains are prepared from aluminum titanate without the need to use nano-sized powder as a starting material. The preparation is achieved by high-energy ball milling of the aluminum titanate followed by sintering at elevated temperature and pressure. The aluminum titanate can be prepared from micron-sized alumina and titania particles through plasma jet processing.

14 Claims, No Drawings

PREPARATION OF NANOCOMPOSITES OF ALUMINA AND TITANIA

STATEMENT AS TO RIGHTS TO INVENTIONS MADE UNDER FEDERALLY SPONSORED RESEARCH AND DEVELOPMENT

This invention was made with United States Government support under Contract No. N00014-01-C-0370, awarded by the Office of Naval Research. The Federal Government has certain rights in this invention.

BACKGROUND OF THE INVENTION

1. Field of the Invention

This invention lies in the field of alumina-based ceramics, and particularly composites of alumina and titania. This invention further relates to methods of processing metal oxide powders into ceramic materials of high density.

2. Description of the Prior Art

Composites of alumina and titania are known for their high toughness, low thermal expansion, and low thermal conductivity. These properties make alumina-titania composites desirable materials of construction and coatings for high-performance applications where thermal barriers are required. These composites are not easily formed by machining, however, and must therefore be formed by superplastic forming, for example with gas pressure or the use of dies. Superplastic forming entails high strain, however, and alumina-titania composites, like many ceramic materials, are susceptible to microcracking. The advent of nanotechnology, however, holds promise for improving the performance properties of alumina-titania ceramics, since when flaws are present in composites with nano-sized grains, the flaws tend to be smaller in size and the composite is therefore more resistant to cracking under high strain. Alumina-titania nanocomposites demonstrate superplasticity at higher strain rates than their microcrystalline counterparts. Superplasticity allows the composites to be formed to net shape in shorter processing times.

Ceramics with nano-sized grains are typically prepared by consolidation of nano-sized powders. This is particularly true of ceramics that contain two or more components, and alumina-titania ceramics are an example of such multi-component ceramics. A difficulty with conventional means of consolidation from nano-sized powders is that grain size tends to grow during the consolidation. This limits the performance of the consolidated material and the options for forming the consolidated material without creating microcracks. In addition, nano-sized powders are costly to obtain.

SUMMARY OF THE INVENTION

It has now been discovered that a dense alumina-titania composite with nano-sized grains can be formed from aluminum titanate ($Al_2TiO_5$) particles by using high-energy ball milling to mechanically activate the aluminum titanate, then sintering the activated material to cause in situ decomposition of the aluminum titanate to alumina and titania during consolidation. One method of forming the aluminum titanate to be mechanically activated is by melting a micron-sized powder mixture of alumina and titania in a plasma stream followed by quenching the melt. The high-energy ball milling avoids the need for nano-sized powders, and also allows the sintering to be performed at pressures that are lower than those previously used for alumina and titania.

These and other objects, advantages, embodiments and implementations of the invention will be apparent from the description that follows.

DETAILED DESCRIPTION OF THE INVENTION AND PREFERRED EMBODIMENTS

High-energy ball milling is a known process, used primarily in the prior art for the preparation of metal alloys from particles of the individual alloying components. High-energy ball milling places the particles in a continuous state of motion relative to each other and to the milling balls and the milling jar, at an energy level high enough to cause repeated fracturing and cold welding of the particles by the action of the milling balls as the particles collide with both the balls and the walls of the milling jar. The particles are thus repeatedly deformed, fractured and rewelded.

Ball milling is typically performed in mills that apply centrifugal, oscillating, and/or planetary action to the powder mixture with the assistance of grinding balls. Parameters and operating conditions such as the sizes of the milling balls, the number of milling balls used per unit amount of powder, the temperature at which the milling is performed, the length of time that milling is continued, and the energy level of the mill, can vary. In most cases, best results will be achieved with the following operating conditions (all figures approximate):

| Parameter | Range |
| --- | --- |
| collision energy (joules) | 0.1 to 1.0, preferably 0.2 to 0.5 |
| milling frequency (cycles per second) | 1 to 200, preferably 3 to 30 |
| impacts per second | 2 to 400, preferably 6 to 60 |
| charge ratio (i.e., ball/powder mass ratio) | 1:1 to 40:1, preferably 1:1 to 10:1, more preferably 2:1 to 5:1 |
| milling time (hours) | 4 to 72, preferably 10 to 40 |
| atmosphere | air is sufficient, inert atmosphere optional |
| dispersant | optional |

The various ball mills known in the metallurgy industry can be used for the high-energy ball milling process. Examples are the SPEX® 8000 mixer/mill (SPEX CertiPrep Industries Inc., Metuchen, N.J., USA), the SIMOLOYER® ball mill (Zoz GmbH, Wenden, Germany), and the Fritsch "Pulverisette" planetary ball mill (Fritsch GmbH, Germany).

The sizes of the alumina titanate particles prior to the milling process are not critical to the invention, although an advantage of the invention, as stated above, is that it avoids the need to use nano-sized particles of alumina and titania as the starting material. The aluminum titanate can be formed from alumina and titania particles that are well outside the nano-size range. The process of the present invention will be successful in achieving a dense alumina-titania composite with nano-sized grains, after mechanical activation and sintering, with a starting material consisting of particles of micron-sized diameter or greater. The starting material can be either the aluminum titanate or alumina and titania particles prior to the processing of these particles to form the aluminum titanate. Thus, for economic reasons and convenience, the preferred starting material consists of particles that are at least 1 micron in diameter. When the aluminum titanate is formed by plasma spraying of alumina and titania, the alumina and titania are preferably particles within the range of about 1 micron to about 300 microns, and most preferably from about 1 micron to about 50 microns.

Sintering of the activated powder mixture is preferably performed by first forming a green compact of the aluminum titanate. Green compacts are formed by simple compaction at moderate pressure. Once formed, the green compact is sintered by applying greater pressure at elevated temperature. The process of this invention does not require spark plasma sintering (electric field-assisted sintering) and can be performed without passing an electric current through the compact. The sintering is preferably performed at a pressure within the range of about 0.5 GPa to about 5.0 GPa (5 to 50 kbar, or approximately $5\times10^3$ to $50\times10^3$ atmospheres), more preferably 0.5 GPa to about 3.0 GPa (5 to 330 kbar, or approximately $5\times10^3$ to $30\times10^3$ atmospheres), and most preferably from about 0.5 GPa to about 2.0 GPa (5 to 20 kbar, or approximately $5\times10^3$ to $20\times10^3$ atmospheres). The sintering temperature is preferably within the range of about 800° C. to about 1,000° C. The pressure can be applied by uniaxial compression or by isostatic compaction. One example of a suitable sintering apparatus is a furnace-housed piston-and-cylinder apparatus disclosed by Boyd, F. R., and J. L. England, "Apparatus for phase equilibrium measurements at pressures up to 50 kb and temperatures up to 1,750° C.," *J. Geophys. Res.* 65: 741–748 (1960), the disclosure of which is incorporated herein by reference although not essential to an understanding of the present invention. During the sintering, the aluminum titanate is decomposed to alumina and titania, and this decomposition is enhanced by the high-energy ball milling that is performed prior to the sintering.

In embodiments of this invention in which the aluminum titanate is prepared from alumina and titania in a plasma jet, the plasma jet procedure is known in the art. According to this procedure, a stream of high-temperature ionized plasma is generated from a gas to which the alumina and titania are inert, by a DC electric arc. Powdered alumina and titania, which as noted above can consist of micron-sized particles or larger, are introduced into a stream of the plasma where they are heated to melting. The stream is propelled toward a cool surface or a cooling medium such as water where the components of the stream are quenched and solidified. During this melting and solidification, the alumina and titania are converted to aluminum titanate.

When alumina and titania particles are used as a starting material, the relative amounts can vary and specific proportions are not critical to the novelty or utility of the invention. Best results will generally be achieved however with an $Al_2O_3$:$TiO_2$ weight ratio of from about 25:75 to about 75:25, preferably from about 50:50 to about 75:25, and most preferably from about 55:45 to about 65:35. The optimal weight ratio will be one that provides a 1:1 mole ratio of $Al_2O_3$ to $TiO_2$, i.e., a weight ratio of approximately 56:44.

The following example is offered solely as illustration.

EXAMPLE

A powder mixture of alumina and titania obtained commercially as the product METCO® 131 (Sulzer Metco (US) Inc., Westbury, N.Y., USA), containing 60% alumina by weight with a particle size of 45 microns, and 40% titania by weight with a particle size of 5 microns, was fed into an air plasma torch where the alumina and titania were melted. The torch was quenched in water, solidifying the aluminum titanate powder. The powder was then placed in tungsten carbide milling jars together with tungsten carbide milling balls measuring 14 mm in diameter, at a charge ratio of 10:4.

The milling jars were then placed on a high-energy milling apparatus (a SPEX 8000 mixer/mill) where milling was performed at approximately 20 impacts per second over a period of 24 hours.

The milled powder was uniaxially compressed into green cylindrical compacts measuring 6 mm in diameter and 6 mm in length. The compacts were then sintered in a piston-cylinder furnace-enclosed sintering apparatus such as that disclosed by Boyd and England, cited above. The furnace was a graphite furnace 32 mm in length and 6.0 mm in diameter, and the compact to be sintered was placed in the center of the furnace. The furnace was encased in a sheath of $CaF_2$ and covered in lead foil. This assembly was then inserted into a pressure vessel of tungsten carbide and cobalt, and uniaxial pressure was applied at 1 GPa for 1 hour as the compact was heated to 800–1,000° C. The $CaF_2$ crumbled under the pressure, transforming the uniaxial pressure to a quasi-hydrostatic pressure over the entire compact. The pressure was then reduced to approximately 0.3 GPa, then both temperature and pressure were allowed to return to ambient levels. The lead foil served as a lubricant to ease the removal of the furnace assembly and sintered compact.

Once the sintered compacts were removed from the pressure vessel, the densities of the compacts were determined by the Archimedes method using deionized water as the immersion medium. The densities thus obtained were greater than 98% theoretical density. Phase characterization was performed by x-ray diffraction using CuKα radiation, indicating that only rutile-titania and alpha-alumina were present. The microstructure was determined by scanning electron microscopy, indicating that the grain sizes were in the range of 70–80 nm on average.

The foregoing is offered for purposes of illustration and explanation. Further variations, modifications and substitutions that, even though not disclosed herein, still fall within the scope of the invention may readily occur to those skilled in the art.

What is claimed is:

1. A process for forming a dense $Al_2O_3$—$TiO_2$ composite, said process comprising:
   (a) mechanically activating $Al_2TiO_5$ particles by high-energy ball milling, and
   (b) sintering said $Al_2TiO_5$ particles thus activated at a temperature of from about 800° C. to about 1,000° C. and a pressure of from about 0.5 GPa to about 5.0 GPa to decompose said $Al_2TiO_5$ particles into a fused mass of $Al_2O_3$ and $TiO_2$ particles comprised of crystals less than 100 nanometers in diameter.

2. The process of claim 1 further comprising forming said $Al_2TiO_5$ particles by solidifying $Al_2TiO_5$ from a plasma stream comprising $Al_2O_3$ and $TiO_2$.

3. The process of claim 2 wherein said plasma stream is formed from $Al_2O_3$ and $TiO_2$ having an average particle size of about 1 micron or greater.

4. The process of claim 2 wherein said plasma stream is formed from $Al_2O_3$ and $TiO_2$ having an average particle size ranging from about 1 micron to about 300 microns.

5. The process of claim 2 wherein said plasma stream is formed from $Al_2O_3$ and $TiO_2$ having an average particle size ranging from about 1 micron to about 50 microns.

6. The process of claim 1 wherein said pressure of step (b) is from about 0.5 GPa to about 3.0 GPa.

7. The process of claim 1 wherein said pressure of step (b) is from about 0.5 GPa to about 2.0 GPa.

8. The process of claim 2 wherein said $Al_2O_3$ and $TiO_2$ are present in said plasmajet in an $Al_2O_3$:$TiO_2$ weight ratio of from about 25:75 to about 75:25.

9. The process of claim 2 wherein said $Al_2O_3$ and $TiO_2$ are present in said plasmajet in an $Al_2O_3$:$TiO_2$ weight ratio of from about 50:50 to about 75:25.

10. The process of claim 2 wherein said $Al_2O_3$ and $TiO_2$ are present in said plasma jet in an $Al_2O_3$:$TiO_2$ weight ratio of from about 55:45 to about 65:35.

11. The process of claim 1 wherein step (b) comprises applying uniaxial pressure to a green compact of said mechanically activated $Al_2TiO_5$ particles.

12. The process of claim 1 wherein step (b) comprises applying uniaxial pressure to a green compact of said mechanically activated $Al_2TiO_5$ particles in the absence of an electric current.

13. The process of claim 1 wherein said high-energy ball milling is performed at 2 to 400 impacts per second for 4 to 72 hours.

14. The process of claim 1 wherein said high-energy ball milling is performed at 6 to 60 impacts per second for 10 to 40 hours.

* * * * *